(12) United States Patent
Riccardi et al.

(10) Patent No.: US 7,420,614 B2
(45) Date of Patent: Sep. 2, 2008

(54) IMAGING DEVICE AND METHOD FOR CONTROLLING SAME

(75) Inventors: Sebastien Riccardi, Saint Martin d'Heres (FR); Vincent Texier, Panissage (FR); Marc Michel, Ste Agnes (FR)

(73) Assignee: Trixell S.A.S. (FR)

( * ) Notice: Subject to any disclaimer, the term of this patent is extended or adjusted under 35 U.S.C. 154(b) by 955 days.

(21) Appl. No.: 10/474,250

(22) PCT Filed: Apr. 19, 2002

(86) PCT No.: PCT/FR02/01358

§ 371 (c)(1),
(2), (4) Date: Oct. 8, 2003

(87) PCT Pub. No.: WO02/089466

PCT Pub. Date: Nov. 7, 2002

(65) Prior Publication Data

US 2004/0080664 A1   Apr. 29, 2004

(30) Foreign Application Priority Data

Apr. 27, 2001   (FR) .................................. 01 05728

(51) Int. Cl.
*H04N 5/225*   (2006.01)
*H04N 5/217*   (2006.01)
(52) U.S. Cl. ........................ 348/372; 348/241
(58) Field of Classification Search .................. 358/190, 358/188, 148, 149; 348/241, 243, 245, 251, 348/607, 257, 372, 373, 374, 375, 376
See application file for complete search history.

(56) References Cited

U.S. PATENT DOCUMENTS

| | | | | | |
|---|---|---|---|---|---|
| 5,161,022 | A | * | 11/1992 | Ichimura et al. | 348/730 |
| 5,850,257 | A | * | 12/1998 | Sakata | 348/241 |
| 6,144,408 | A | * | 11/2000 | MacLean | 348/241 |

FOREIGN PATENT DOCUMENTS

| | | | |
|---|---|---|---|
| EP | 0 886 441 A | | 12/1998 |
| EP | 886441 A2 | * | 12/1998 |
| EP | 0 899 946 A | | 3/1999 |
| EP | 899946 A2 | * | 3/1999 |

* cited by examiner

*Primary Examiner*—Ngoc-Yen T. Vu
*Assistant Examiner*—Peter Chon
(74) *Attorney, Agent, or Firm*—Lowe Hauptman Ham & Berner, LLP

(57) ABSTRACT

The invention pertains to an imaging device and to a process for controlling the device. The device comprises a power supply (1), matrix means allowing an image to be emitted or sensed, the matrix of the matrix imaging means being scanned at a scanning frequency, the power supply (1) converting a DC input voltage (Dce) into at least one DC output voltage (DCs) allowing the powering of the matrix imaging means (2). The power supply (1) is of chopped type and chops the DC input voltage (Dce) at a chopping frequency dependent on the scanning frequency. In the process for controlling the imaging device described above, a useful image is preceded by an offset image and a correction dependent on the offset image is applied to the useful image.

5 Claims, 3 Drawing Sheets

IMAGING DEVICE AND METHOD FOR CONTROLLING SAME

The invention pertains to an imaging device and to a process for controlling the device. The device comprises matrix means making it possible to emit or sense an image. Stated otherwise, the invention can be implemented for any matrix screen or camera.

The matrix means comprise a large number of dots organized row-wise and column-wise. The dots are used successively, thereby rendering the device sensitive to temporal variations in supply voltages which provide it with the energy necessary for it to operate. As a safeguard against such temporal variations, use has been made of linear power supplies which, by their nature, are renowned for delivering DC voltages which are very stable over time. Linear power supplies are generally very voluminous and are therefore unsuitable for mobile matrix means. Moreover, linear power supplies dissipate considerable energy. These two drawbacks of linear power supplies often make it necessary for them to be distanced from the matrix means, be they mobile or otherwise, this possibly giving rise to other disturbances, for example of electromagnetic types in the cables linking the power supply and the matrix means.

Attempts have moreover been made to use chopped power supplies to provide the energy required for the matrix means to operate. These power supplies are much less voluminous and consume less energy than linear power supplies, hence they can be brought close to the matrix devices. Consequently, the electromagnetic disturbances may be minimized. On the other hand, the voltages provided by a chopped power supply are much less stable over time than the voltages provided by a linear power supply. Consequently, the chopped power supply engenders considerable disturbances to the images emitted or sensed by the matrix means.

The invention makes it possible to alleviate the various drawbacks cited above. For this purpose, a subject of the invention is an imaging device comprising a power supply, matrix imaging means, synchronization means, the matrix of the matrix imaging means being scanned at a scanning frequency, the power supply converting a DC input voltage into at least one DC output voltage allowing the powering of the matrix imaging means, characterized in that the power supply is of chopped type and in that the chopped power supply chops the DC input voltage at a chopping frequency dependent on the scanning frequency.

The invention may be implemented regardless of the manner in which the matrix means are synchronized. By way of example, each dot of a row of the matrix can be used successively and all the rows of the matrix can be strung together successively. It is also possible to simultaneously use all the dots of one row before using the next row and to thus string together all the rows of the matrix.

The invention may be implemented in respect of dots arranged along a single row and several columns so as to constitute a strip array.

The principal temporal variations in the output voltage or voltages of the chopped power supply are synchronized with the chopping frequency. By synchronizing the scanning frequency of the matrix means, the disturbances engendered by the temporal variations in the output voltage or voltages become repetitive and it is possible to correct these disturbances for example by means of an offset image.

For this purpose, a subject of the invention is a process for controlling an imaging device comprising a power supply, matrix imaging means, the matrix of the matrix imaging means being scanned at a scanning frequency, the power supply converting a DC input voltage into at least one DC output voltage allowing the powering of the matrix imaging means, characterized in that the power supply is of chopped type and in that the chopped power supply chops the DC input voltage at a chopping frequency dependent on the scanning frequency, in that a useful image is preceded by an offset image and in that a correction dependent on the offset image is applied to the useful image.

The invention is of particular interest when it is implemented in respect of a matrix camera and when a digital processing of the data captured by the camera is performed, which processing tends to increase the gain of the image. Specifically, this processing amplifies both the image and the disturbances that it contains. Without implementing the invention, there would be a risk of the image being masked under the disturbances amplified by the processing. By way of example, this type of processing is used to intensify a low-brightness image or in medical imaging carried out using X-rays in order to visualize different elements from a single exposure of the patient to X-rays. More precisely, based on a single snapshot, it is possible to produce several different visible images, for example to visualize vessels in respect of one image and bones in respect of another image. The choice of the element to be visualized is made by increasing the gain of part of the data captured by the camera.

The invention will be better understood and other advantages will become apparent on reading the detailed description of an embodiment of the invention, which description is illustrated by the appended drawing in which.

To simplify the description, the same elements will bear the same topological tags in the various figures.

Figure 1:
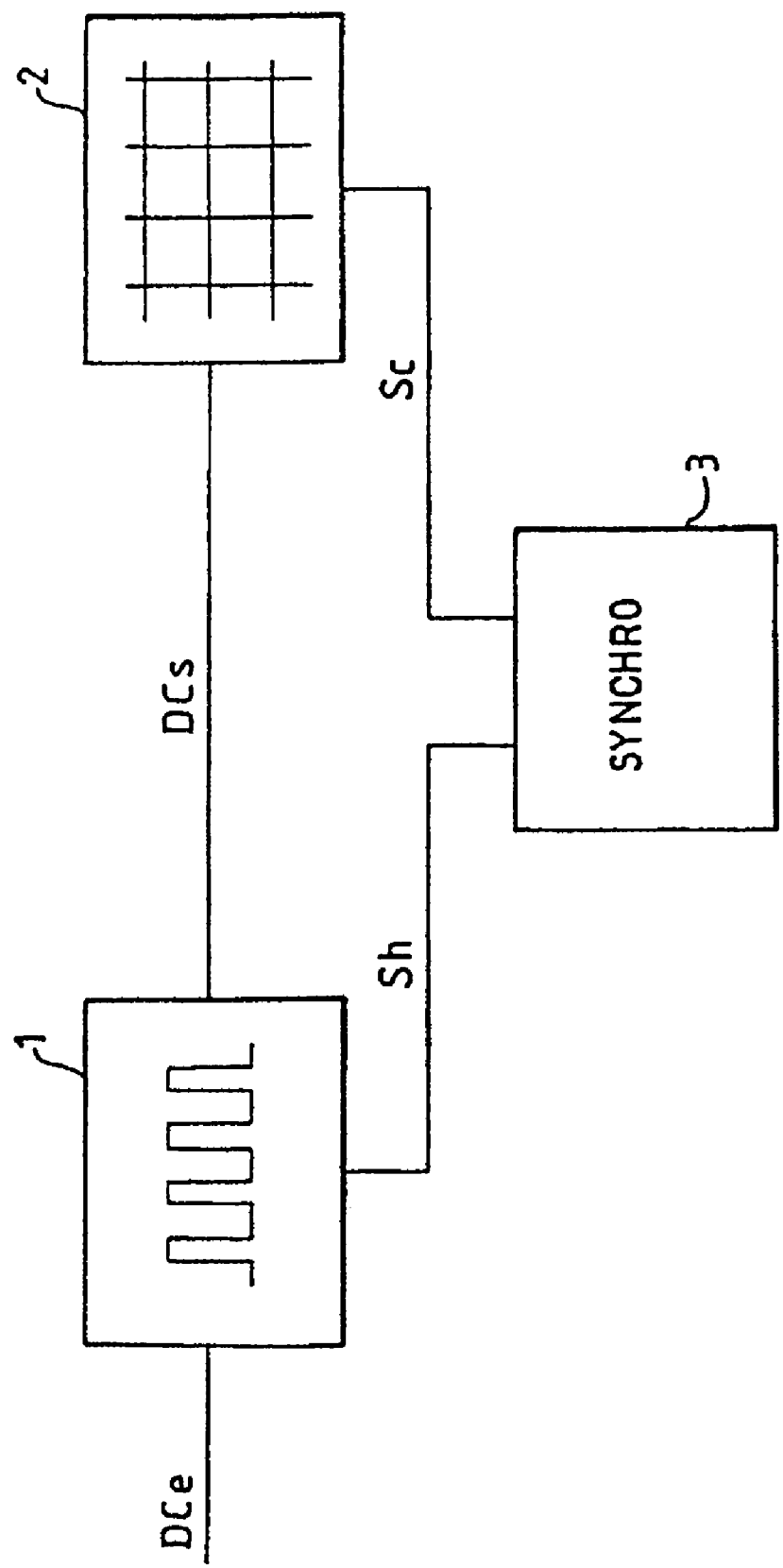
FIG. 1 represents, in block diagram form, the various elements of a device in accordance with the invention.

The device represented in FIG. 1 comprises a chopped power supply 1, matrix imaging means 2 formed of a matrix of dots and synchronization means 3. The chopped power supply converts a DC input voltage Dce so as to form at least one DC output voltage DCs which powers the matrix means 2. The chopped power supply 1 chops the DC input voltage Dce at a so-called chopping frequency and then averages the chopped signal to form the DC output voltage DCs. One and the same chopped power supply can provide several output voltages DCs depending on the energy requirements of the matrix means 2 and the synchronization means. The synchronization means 3 provide the matrix means 2 with a synchronization signal Sc whose so-called scanning frequency makes it possible to sequence the use of the various dots of the matrix means 2. The synchronization means 3 provide the chopped power supply 1 with a chopping signal Sh. The frequency of chopping of the signal Sh is dependent on the scanning frequency.

By way of example, the image defined by the matrix means is scanned at a frequency of 50 Hertz and the chopping frequency is of the order of 200 kilohertz. The synchronization means then define the chopping frequency as a multiple of the scanning frequency. The production of the chopped power supply 1 may necessitate a frequency span which is to be complied with for the chopping frequency. In this case, the multiple defined above is chosen so that the scanning frequency multiplied by this multiple lies within the span.

By producing the DC output voltage DCs by chopping the DC input voltage, then by averaging the chopped signal, the DC output voltage DCs comprises disturbances synchronized with the chopping frequency. These disturbances are dependent on the energy provided by the chopped power supply.

Figure 2A:
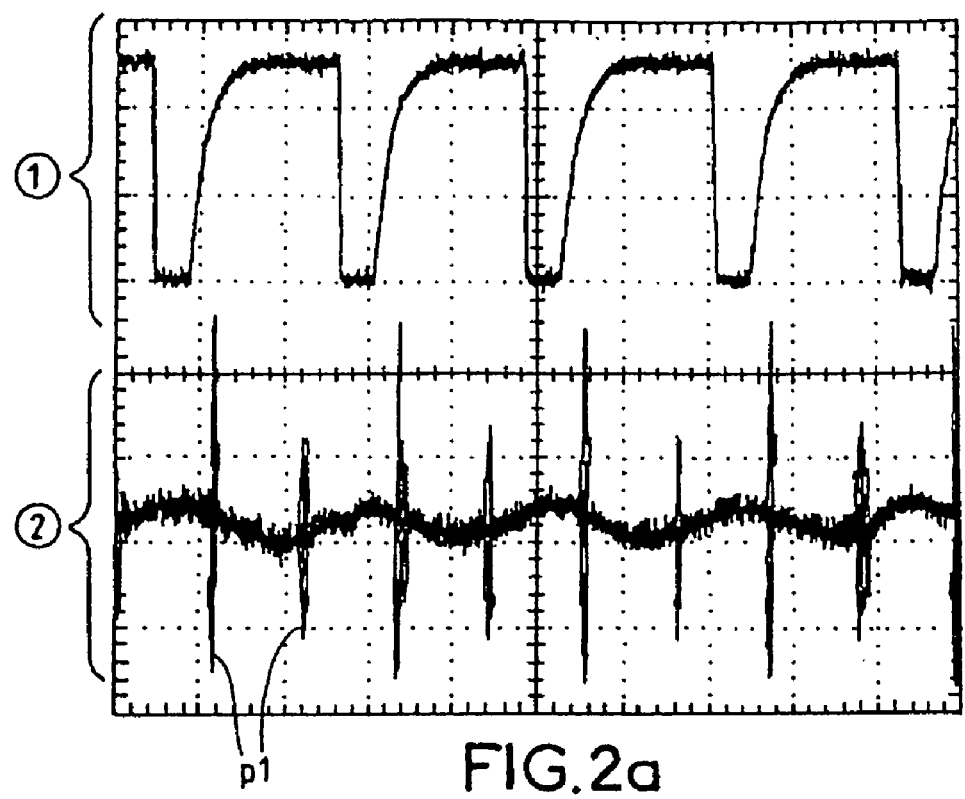
FIGS. 2a and 2b represent an exemplary temporal variation of the output voltage of a chopped power supply.

By way of example, FIG. 2a represents the observation made on the screen of an oscilloscope of the disturbances of the output voltage DCs. The chopping signal Sh is shown on a first channel ① of the oscilloscope. This is a periodic signal gated at the chopping frequency. The signal DCs is shown on a second channel ②. The scale of the representation is of the order of a millivolt per division. The signal DCs is synchronized with the signal Sh present on the first channel ① and it exhibits a ripple at the chopping frequency. The signal DCs moreover exhibits spikes p1 also synchronized with the chopping frequency.

Figure 2B:
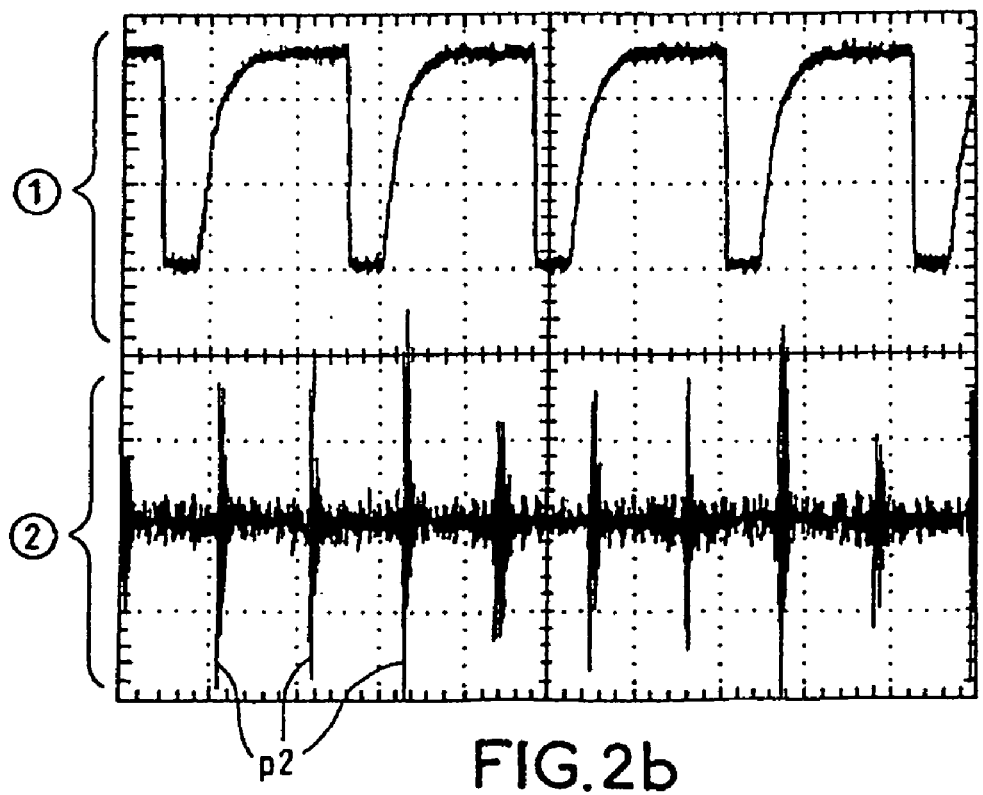

Furthermore, the magnetic field radiated in the vicinity of the chopped power supply is shown in FIG. 2b. Just as for FIG. 2a, the chopping signal Sh is shown on channel ① of the oscilloscope. On the other hand, shown on channel ② is a voltage which develops across the terminals of an inductor with several turns, which inductor is placed in the immediate vicinity of the chopped power supply. The voltage charted across the terminals of the inductor gives an image of the magnetic field radiated by the chopped power supply. The voltage shown on channel ② exhibits spikes p2 synchronized with the chopping signal Sh.

By synchronizing the scanning of the matrix means 2 and the chopping of the chopped power supply, the disturbances conducted or radiated by the power supply will be found at the same dots of the matrix imaging means 2 for each image emitted or received.

Figure 3:
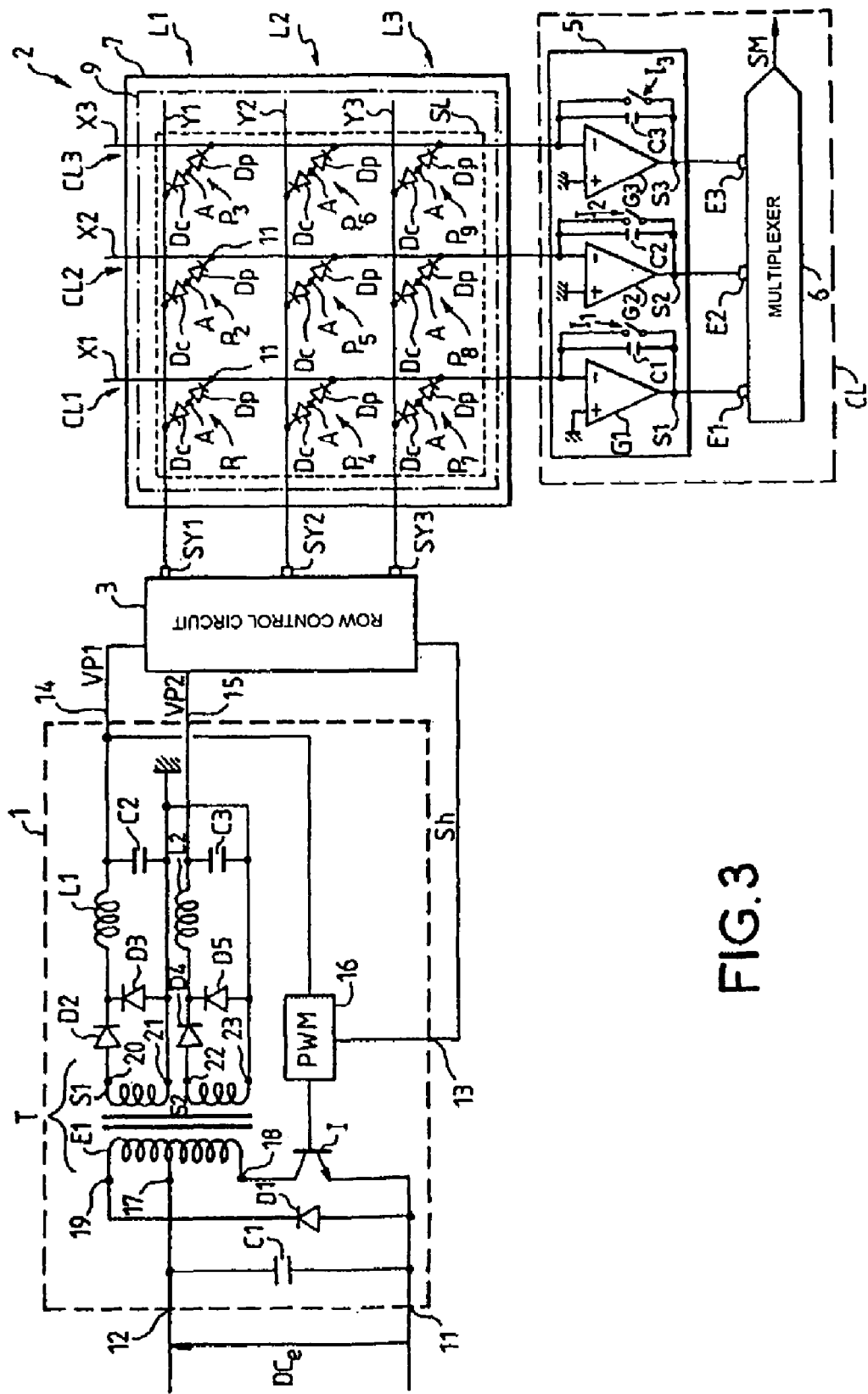
FIG. 3 represents, in diagrammatic form, an embodiment of a device comprising matrix photosensitive means.

The device represented in FIG. 3 comprises a chopped power supply 1, matrix imaging means and synchronization means 3. The chopped power supply 1 receives the DC input voltage Dce between two input terminals 11 and 12, as well as the synchronization signal Sc on an input terminal 13. The chopped power supply 1 delivers two DC voltages VP1 and VP2 respectively on two output terminals 14 and 15. The chopped power supply 1 comprises a transformer T comprising a primary winding E1 and two secondary windings S1 and S2, three capacitors C1 to C3, five diodes D1 to D5, two inductors L1 and L2, an electronic switch I and control means 16 for the electronic switch I.

The capacitor C1 is linked between the terminals 11 and 12. The terminal 12 is linked to an intermediate terminal 17 of the primary winding E1. The terminal 11 is linked to the anode of the diode D1 and to a first end terminal 18 of the primary winding E1 by way of the electronic switch I. The cathode of the diode D1 is linked to a second end terminal 19 of the primary winding E1. The diode D1 makes it possible to preclude the formation of overvoltages between the terminals of the primary winding E1.

The anode of the diode D2 is linked to a first terminal 20 of the secondary winding S1 and the anode of the diode D3 is linked to a second terminal 21 of the secondary winding S1. The cathodes of the two diodes D2 and D3 are both linked to a first terminal of the inductor L1. The second terminal of the inductor L2 forms the output terminal 14 and is linked to the second terminal 23 of the secondary winding S2 by way of the capacitor C2. The diodes D4 and D5, the inductor L2 and the capacitor C2 rectify an alternating current flowing around the secondary winding S1 so as to form the DC voltage VP1.

Likewise, the anode of the diode D4 is linked to a first terminal 22 of the secondary winding S2 and the anode of the diode D5 is linked to a second terminal 23 of the secondary winding S2. The cathodes of the two diodes D4 and D5 are both linked to a first terminal of the inductor L2. The second terminal of the inductor L1 forms the output terminal 15 and is linked to the second terminal 21 of the secondary winding S1 by way of the capacitor C3. The diodes D2 and D3, the inductor L1 and the capacitor C3 rectify an alternating current flowing around the secondary winding S1 so as to form the DC voltage VP2.

The control means 16 of the electronic switch I receive the chopping signal Sh from the synchronization means 3. The control means 16 also receive the voltage VP1. The means 16 open and close the switch I at the frequency of the signal Sh in such a way as to create an alternating current in the primary winding E1. This current generates other alternating currents in the secondary windings S1 and S2. The voltage VP1 is regulated by adapting the ratio between the duration for which the switch I is closed relative to the duration for which the switch I is open. This regulation is effected by the means 16 as a function of the voltage VP1 that they receive. This mode of regulation is known in the literature by the name "Pulse Width Modulation".

By way of an alternative, it is possible to replace the diodes D3 and D5 with electronic switches of for example MOSFET type, controlled by the means 16.

The matrix imaging means 2 comprise photosensitive dots P1 to P9, each formed by a photosensitive diode Dp and a switching diode Dc mounted in series according to a head-to-tail configuration. The matrix imaging means 2 comprise row-wise conductors Y1 to Y3 crossed with column-wise conductors X1 to X3, with, at each crossover, a photosensitive dot connected between a row conductor and a column conductor. The photosensitive dots P1 to P9 are thus arranged along rows L1 to L3 and columns CL1 to CL3.

In the example of FIG. 2, only three rows and three columns are represented which define nine photosensitive dots, but such a matrix may have a much larger capacity, possibly rising to several million dots. It is common for example to produce such matrices having photosensitive dots arranged along 3000 rows and 3000 columns (within an area of the order of 40 cm×40 cm), or else arranged in a single row and several columns to constitute a detection strip array.

The photosensitive device comprises synchronization means 3 forming a row control circuit, whose outputs SY1, SY2, SY3 are connected respectively to the row conductors Y1, Y2, Y3. The row control circuit 3 has various elements (not represented), such as for example clock circuit, switching circuits, shift register, which allow it to carry out sequential addressing of the row conductors Y1 to Y3, as well as the generating of the chopping signal Sh. The row control circuit 3 receives the voltage VP1 serving to define the amplitude of bias pulses applied to the row conductors and a source, as well as the voltage VP2 serving to define the amplitude of reading pulses applied to the row conductors. These two voltages may possibly be one and the same.

In each photosensitive dot P1 to P9, the two diodes Dp, Dc are connected together either by their cathode, or by their anode as in the example represented. The cathode of the photodiode Dp is connected to a column conductor X1 to X3, and the cathode of the switching diode Dc is connected to a row conductor Y1 to Y3.

The column conductors X1 to X3 are connected to a reading circuit CL, comprising for example an integrator circuit 5, and a multiplexer circuit 6 formed for example of a shift register with parallel inputs and serial output which may be of the CCD type (standing for "Charge Coupled Device"). Each column conductor is connected to a negative input "−" of an amplifier G1 to G3 mounted as an integrator. An integration capacitor C1 to C3 is mounted between the negative input "−" and an output S1 to S3 of each amplifier. The second input "+" of each amplifier G1 to G3 is connected to a potential which in the example is the reference potential Vr, which potential is subsequently imposed on all the column conductors X1 to X3. Each amplifier comprises a so-called reset switch element I1 to I3 (consisting for example of a transistor of the MOS type), mounted in parallel with each integration capacitor C1 to C3.

The output S1 to S3 of the amplifiers are connected to the inputs E1 to E3 of the multiplexer 6. This conventional arrangement makes it possible to deliver, "in series" and row after row (L1 to L3) at the output SM of the multiplexer 6, signals that correspond to the charges accumulated at the dots "A" of all the photosensitive dots P1 to P9.

It should be noted that, in order to fulfil the switch function which, in the example of FIG. 2, is undertaken by the switching diode Dc, it is also known to use a transistor; the latter exhibits greater complexity of connection as compared with the diode, but it offers advantages in the quality of its "on" state.

To obtain a useful image of optimal quality, a correction of the useful image is performed on the basis of a so-called offset image known as a black image and generally captured and stored at the start of an operating cycle. This offset image is the image obtained while the photosensitive device is exposed to a zero-strength signal and corresponds to a kind of background image. The offset image varies as a function of the electrical state of the components of the photosensitive dots and the dispersion of their electrical characteristics and of course their supply voltage. The useful image is the one read while the photosensitive device has been exposed to a useful signal that corresponds to exposure to electromagnetic radiation. It encompasses the offset image. The correction consists in performing a subtraction between the useful image and the offset image.

The invention claimed is:

1. An imaging device comprising:
    a power supply; and
    a matrix imaging means comprising a matrix of dots;
    wherein the matrix of dots is scanned at a scanning frequency, the power supply converting a DC input voltage (DCe) into at least one DC output voltage (DCs) allowing the powering of the matrix imaging means;
    wherein the power supply is of a chopped type, the chopped power supply chops the DC input voltage (DCe) at a chopping frequency and the scanning frequency is synchronized with the chopping frequency;
    wherein the chopping frequency is a periodic signal without interruption and is a multiple of the scanning frequency;
    wherein the matrix imaging means is arranged to render repetitive disturbance generated variations in the DCs; and
    wherein disturbances generated by the chopped power supply due to the chopping frequency are configured to be found at the same dots of the matrix being imaged.

2. The imaging device according to claim 1, wherein further comprising synchronization means, the synchronization means provides the matrix imaging means with a signal (Sc) whose frequency is the scanning frequency, and in that the synchronization means provide the chopped power supply with a signal (Sh) at the chopping frequency.

3. The imaging device according to claim 1, further comprising synchronization means, the synchoronization means configured to provide the matrix imaging means with a signal (Sc) whose frequency is the scanning frequency, provide the chopped power supply with a signal (Sh) at the chopping frequency.

4. A process for controlling an imaging device comprising a chopping power supply, a matrix imaging means formed of a matrix of dots, and a synchronization means, the processing comprising:
    generating a non-interrupting chopping signal (Sh) by gating a DC input voltage to the chopping power supply at a chopping frequency, the chopping frequency being a multiple of a scanning frequency of the matrix imaging means;
    driving the matrix imaging means with at least one DC output voltage of the chopping power supply; and
    scanning the matrix imaging means at the scanning frequency;
    wherein the scanning frequency is synchronized with the chopping frequency; and
    wherein a useful image is preceded by an offset image and a correction dependent on the offset image is applied to the useful image;
    wherein disturbances generated by the chopped power supply due to the chopping frequency are configured to be found at the same dots of the matrix being imaged.

5. The control process according to claim 4, wherein the said correction consists in subtracting the offset image from the useful image.

* * * * *